(12) United States Patent
Carl (10) Patent No.: US 12,448,054 B2
(45) Date of Patent: Oct. 21, 2025

(54) FLOOR STRUCTURE FOR A BODY OF A VEHICLE, BODY FOR A VEHICLE, AND VEHICLE

(71) Applicant: Mercedes-Benz Group AG, Stuttgart (DE)

(72) Inventor: Michael Carl, Gerlingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 373 days.

(21) Appl. No.: 18/041,108

(22) PCT Filed: Jul. 30, 2021

(86) PCT No.: PCT/EP2021/071379
§ 371 (c)(1),
(2) Date: Feb. 9, 2023

(87) PCT Pub. No.: WO2022/033894
PCT Pub. Date: Feb. 17, 2022

(65) Prior Publication Data
US 2023/0264758 A1   Aug. 24, 2023

(30) Foreign Application Priority Data
Aug. 13, 2020   (DE) .................... 10 2020 004 924.9

(51) Int. Cl.
*B62D 25/20* (2006.01)
*B60K 1/04* (2019.01)
(Continued)

(52) U.S. Cl.
CPC ............ *B62D 25/2036* (2013.01); *B60K 1/04* (2013.01); *B62D 21/157* (2013.01);
(Continued)

(58) Field of Classification Search
CPC .... B62D 21/157; B62D 25/02; B62D 25/025; B62D 25/20; B62D 25/2036; B60K 1/04; B60K 2001/0438
(Continued)

(56) References Cited

U.S. PATENT DOCUMENTS

| 10,421,500 B2 | 9/2019 | Tanabe |
| 2009/0102238 A1* | 4/2009 | Gomi ..................... B62D 25/20 296/193.07 |

(Continued)

FOREIGN PATENT DOCUMENTS

| CN | 102381366 A | 3/2012 |
| CN | 204587044 U | 8/2015 |

(Continued)

OTHER PUBLICATIONS

PCT/EP2021/071379, International Search Report dated Oct. 4, 2021 (Two (2) pages).

(Continued)

*Primary Examiner* — Gregory A Blankenship
(74) *Attorney, Agent, or Firm* — Crowell & Moring LLP (57) ABSTRACT

A floor structure for a body of a vehicle includes two side sills spaced apart from each other in a transverse direction of the vehicle. A main floor element is disposed between the two side sills. An energy store is disposed under the main floor element. A crossmember element is disposed on an upper side of the main floor element and extends in the transverse direction of the vehicle between the two side sills. A hollow cross section of the crossmember element is delimited upwardly in the vertical direction of the vehicle by an upper flange of the crossmember element and is supplemented by the main floor element to form a closed hollow cross section. A reinforcement element is attached to the main floor element via a first attachment region and is
(Continued)

attached to the upper flange via a second attachment region and a third attachment region.

11 Claims, 9 Drawing Sheets

(51) Int. Cl.
  *B62D 21/15* (2006.01)
  *B62D 25/02* (2006.01)
  *H01M 50/249* (2021.01)
(52) U.S. Cl.
  CPC ........ *B62D 25/025* (2013.01); *H01M 50/249* (2021.01); *B60K 2001/0438* (2013.01)
(58) Field of Classification Search
  USPC .... 296/187.08, 187.12, 193.05, 193.07, 204, 296/203.03, 209
  See application file for complete search history.

(56) References Cited

U.S. PATENT DOCUMENTS

| | | | | |
|---|---|---|---|---|
| 2012/0049501 A1* | 3/2012 | Fujii | ................... | B60R 22/195 |
| | | | | 280/806 |
| 2013/0257097 A1* | 10/2013 | Kojo | ................. | B62D 25/2036 |
| | | | | 296/187.08 |
| 2016/0200371 A1 | 7/2016 | Inamoto | | |
| 2017/0051360 A1* | 2/2017 | Bais | ....................... | A61P 43/00 |
| 2018/0222535 A1* | 8/2018 | Tanabe | ................ | B62D 25/025 |
| 2018/0312199 A1* | 11/2018 | Kawase | ................... | B60K 1/04 |
| 2019/0009833 A1 | 1/2019 | Yamagishi | | |
| 2019/0359048 A1* | 11/2019 | Tsuyuzaki | ................ | B60K 1/04 |
| 2022/0016966 A1 | 1/2022 | Kecalevic et al. | | |
| 2023/0264758 A1* | 8/2023 | Carl | ....................... | B62D 25/20 |
| | | | | 296/187.12 |
| 2024/0051611 A1* | 2/2024 | An | .......................... | B60K 1/04 |
| 2024/0359747 A1* | 10/2024 | Kang | ................. | B62D 25/2036 |
| 2024/0391308 A1* | 11/2024 | Hilmann | ................. | B60K 1/04 |

FOREIGN PATENT DOCUMENTS

| | | |
|---|---|---|
| CN | 106956721 A | 7/2017 |
| CN | 109969268 A | 7/2019 |
| CN | 210793364 U | 6/2020 |
| DE | 10 2014 007 165 A1 | 11/2014 |
| DE | 10 2017 130 708 A1 | 8/2018 |
| DE | 10 2018 007 557 A1 | 3/2020 |
| DE | 10 2018 132 258 A1 | 6/2020 |
| EP | 2 143 620 A1 | 1/2010 |
| EP | 3 398 838 A1 | 11/2018 |
| JP | 2017-193299 A | 10/2017 |

OTHER PUBLICATIONS

German-language German Office Action issued in German application No. 10 2020 004 924.9 dated Apr. 14, 2021 (Nine (9) pages).
Chinese-language Chinese Office Action issued in Chinese Application No. 202180055878.3 dated Aug. 16, 2024 (10 pages).
Chinese-language Office Action issued in Chinese Application No. 202180055878.3 dated Feb. 25, 2025 (9 pages).

* cited by examiner

FLOOR STRUCTURE FOR A BODY OF A VEHICLE, BODY FOR A VEHICLE, AND VEHICLE

BACKGROUND AND SUMMARY OF THE INVENTION

The invention relates to a floor structure for a body of a vehicle. Furthermore, the invention relates to a body for a vehicle, and to a vehicle.

JP 2017 193 299 A1 discloses a floor structure for a body of a vehicle. Here, a battery is disposed between frame elements, the battery comprising battery modules in which a plurality of cells are stacked along a direction. A floor element is disposed on the battery, an upper crossmember being disposed on the floor element and extending in the transverse direction of the vehicle.

The generic document DE 10 2017 130 708 A1 presents a floor structure for a vehicle body, which comprises a main floor element, on the side of which facing a passenger compartment there are placed a number of downwardly open crossmembers, each of which is provided with an internal U-shaped reinforcement profile. The reinforcement profile is attached to side flanges of the crossmember and reinforces it in the region of an upper flange connecting the side flanges to each other.

It is the object of the present invention to create a floor structure for a body of a vehicle, a body for a vehicle, and a vehicle having such a body, so that the floor structure can be designed in a cost-, weight- and installation-space-efficient and modularly adaptable manner, while at the same time a beneficial accident behaviour can be realized.

A first aspect of the invention relates to a floor structure for a body, in particular for a self-supporting body, of a vehicle preferably formed as a motor vehicle, in particular as a motor car and very particularly as a passenger car. As will be explained in greater detail below, an interior of the vehicle, also referred to as a passenger cell or passenger compartment, in the interior of which at least one or more persons can be present, in particular during a journey of the vehicle, is at least partially, in particular at least predominantly or completely, delimited downwardly in the vertical direction of the vehicle by the floor structure in the fully produced state of the vehicle. The floor structure comprises at least or exactly two side sills spaced apart from each other in the transverse direction of the vehicle, as well as at least one main floor element which is arranged between the side sills in the transverse direction of the vehicle. For example, the main floor element is attached in the transverse direction of the vehicle on one side, in particular at one end, to one of the side sills, in particular directly, although the main floor element can, for example, be attached in the transverse direction of the vehicle on the other side, in particular at the other end, to the other side sill, in particular directly. In particular, in the fully produced state of the vehicle, the interior is at least partially, in particular at least predominantly or completely, delimited downwardly in the vertical direction of the vehicle by the floor element. Preferably, the floor element is at least substantially planar. In other words, it is preferably provided that the floor element has a flat extent at least in a predominant partial region of the floor element, in particular completely, and is thus designed as a sheet element. It is conceivable here that the floor element itself is at least substantially flat and thus planar on its upper side facing upwards in the vertical direction of the vehicle and/or on its lower side facing downwards in the vertical direction of the vehicle, in particular at least in a partial region and preferably at least in a predominant partial region and thus over more than half of a plane of the floor element extending and spanned in the longitudinal direction of the vehicle or in the transverse direction of the vehicle.

The floor structure also comprises, arranged under the main floor element in the vertical direction of the vehicle, at least one energy store in which or by means of which electrical energy, in particular electrical current, and/or a liquid or gaseous fuel, for example, can be stored, i.e., received. In its fully manufactured state, the motor vehicle has at least one drive motor by means of which the motor vehicle can be driven. For this purpose, the drive motor can be supplied with the electrical energy stored in the energy store or with the fuel stored in the energy store. Thus, the drive motor can be, for example, an electric machine or a combustion engine, i.e., an internal combustion engine.

The floor structure also has at least one crossmember element arranged on an upper side of the main floor element facing upwards in the vertical direction of the vehicle and away from the energy store, which crossmember element extends in the transverse direction of the vehicle between the side sills. The crossmember element is also referred to as a crossmember or floor crossmember, the longitudinal extent of which runs in the transverse direction of the vehicle, i.e., parallel to the transverse direction of the vehicle. In other words, the crossmember element extends in or at least substantially in the transverse direction of the vehicle. The crossmember element has a hollow cross section that is open per se, i.e., considered on its own, downwardly in the vertical direction of the vehicle. The hollow cross section of the crossmember element is delimited, i.e., closed, upwardly in the vertical direction of the vehicle by an upper flange of the crossmember element. The upper flange of the crossmember element is a wall of the crossmember element, the wall being spaced apart from the main floor element, for example in the vertical direction of the vehicle. The main floor element can, for example, be formed from a metal material, in particular from a sheet metal, so that the main floor element is also referred to, for example, as the main floor sheet or main floor sheet element. The hollow cross section of the crossmember element, which is open downwardly in the vertical direction of the vehicle, is supplemented by the main floor element, in particular by its upper side, to form a closed hollow cross section. The hollow cross section, which is open per se, of the crossmember element extends, for example, in the transverse direction of the vehicle at least over a length region and thus at least over part of a length or width of the crossmember element running in the transverse direction of the vehicle. Preferably, the open hollow cross section extends at least over more than half of the width or length running in the transverse direction of the vehicle and preferably over the entire width or length of the crossmember element running in the transverse direction of the vehicle. Here, the hollow cross section, which is open per se, is closed by the main floor element at least in a longitudinal region, in particular at least predominantly or completely, and thus supplements the closed hollow cross section. Thus, the crossmember element and the main floor element form a profile having the closed hollow cross section, whereby a particularly high rigidity of the floor structure, which is also referred to as the substructure, can be created in a weight-efficient manner.

In order to be able to design the floor structure in a particularly cost-, weight- and installation-space-efficient and modularly adaptable manner and at the same time be able to realize a particularly advantageous accident behaviour of the floor structure and thus of the body and the vehicle as a whole, it is provided in accordance with the invention that in particular at least one or exactly one reinforcement element extending in the transverse direction of the vehicle at least over a partial region of the crossmember element is arranged in the closed hollow cross section. In particular, the reinforcement element extends in the transverse direction of the vehicle at least over a partial region between the two side sills, also referred to as side sill structures. The reinforcement element, also referred to as the floor crossmember reinforcement, is attached to the main floor element, in particular directly, via at least one first attachment region, in particular of the reinforcement element. Furthermore, the reinforcement element is attached to the upper flange, in particular directly, via second and third attachment regions arranged at a distance from each other in the longitudinal direction of the vehicle. As a result, the upper flange and thus the crossmember element are reinforced by means of the reinforcement element, whereby, for example, in the event of a side impact or in the event of an accident-related application of force to the vehicle acting in the transverse direction of the vehicle, impact or accident energy can be absorbed or supported and guided in a particularly advantageous manner by the floor structure and in particular by the profile reinforced by means of the reinforcement element. This can protect the energy store particularly advantageously, especially from excessive damage. In addition, the floor structure can be used to provide particularly good protection for persons in the interior, including those referred to as passengers. The floor structure can be adapted here to different vehicles or vehicle derivatives in a particularly simple modular and needs-based manner and can thus be used particularly advantageously for vehicles that are based on a common platform but have increased requirements with regard to the protection of the energy store or with regard to protection of electrical components and/or an increased vehicle weight compared to a basic vehicle.

The vehicle can in particular have the aforementioned electrical components if the vehicle is formed as an electric vehicle, in particular as a battery-electric vehicle, which can be driven purely electrically, in particular using the electrical energy stored in the energy store. In particular, the floor structure can ensure a particularly advantageous high-voltage safety. This is to be understood in particular to mean that the energy store can be a high-voltage component of which the electrical voltage, in particular electrical operating or nominal voltage, is greater than 50 volts, in particular greater than 60 volts, and is preferably several hundred volts, in order thereby to be able to realize particularly high electrical outputs for driving, in particular purely electrically, the vehicle which is formed, for example, as an electric vehicle. In particular, the energy store can be formed as a high-voltage battery (HV battery). In addition, the fact that the crossmember element and thus the closed hollow cross section is arranged, in particular in each case completely, in the vertical direction of the vehicle above the main floor element means that an excessive number of crossmember structures arranged below the main floor element in the vertical direction of the vehicle, which extend, for example, in the transverse direction of the vehicle and at the same time extend, for example, through the energy store and/or divide the energy store into respective parts, can be avoided. In particular, it is possible to avoid such crossmember structures arranged below the main floor element in the vertical direction of the vehicle. In this way, a particularly large, contiguous space can be created in the transverse direction of the vehicle below the main floor element, i.e., on its underside, the space being free of crossmember structures and being usable to accommodate the energy store in an installation-space-efficient manner. In other words, the energy store can be arranged at least partially, in particular at least predominantly or completely, in the space. Since the space can be designed to be particularly large, the energy store can also be dimensioned to be correspondingly large, thereby creating a particularly high storage capacity for storing the electrical energy or the fuel. As a result, a particularly large range can be achieved over which the vehicle can be driven using the electrical energy stored in the energy store or using the fuel stored in the energy store, in particular by means of the aforementioned drive motor.

According to the invention, as an alternative to the arrangement of the reinforcement element within the hollow cross section delimited between the crossmember element and the main floor element, it is provided that the reinforcement element, which extends in the transverse direction of the vehicle at least over a partial region of the crossmember element and serves to reinforce the crossmember element, is placed on the crossmember element from the outside, the crossmember element and the reinforcement element having at least one connection point on the upper flange and at least one further connection point in the region between the upper flange and the main floor element, and at least one closed hollow cross section being delimited by the crossmember element and the reinforcement element placed thereon. The reinforcement element is thus arranged on the side of the crossmember element upper flange facing a passenger compartment and closes there an open-edge recess in the crossmember element, thus forming the hollow cross section, or else has at least one corresponding moulding additionally or alternatively to the recess on the crossmember element, so that the hollow cross section is formed.

The invention is based in particular on the realisation that large transverse structures, thus requiring a large amount of installation space, are conventionally used to protect the energy store. In this case, the transverse structures are conventionally arranged below the main floor element in the vertical direction of the vehicle, with the transverse structures being arranged inside the energy store. This is to be understood to mean in particular that the energy store must usually be arranged around the conventional transverse structures or must have recesses for the transverse structures. This means in particular that the energy store cannot be arranged or no energy, for example no fuel, can be stored at points or in regions where the transverse structures are conventionally arranged. In addition, these conventional solutions result in cost and weight disadvantages and a demand-oriented or flexible adaptation of the floor structure to different vehicle derivatives is not possible or only possible with great effort. By contrast, the floor structure according to the invention is modular and can be easily adapted to different vehicles or vehicle derivatives, while at the same time the installation space requirement, the weight and the costs of the floor structure can be kept particularly low. At the same time, both the energy store and the passengers present in the interior can be advantageously protected by means of the floor structure, in particular in the event of a side impact.

In order to be able to reinforce the upper flange and thus the crossmember element in a particularly advantageous manner and consequently to be able to realize a particularly advantageous accident behaviour, it is provided in one embodiment of the invention that the first attachment region and the second attachment region are arranged at least partially offset to each other in the longitudinal direction of the vehicle. Since the upper flange is arranged above the main floor element or higher than the main floor element in the vertical direction of the vehicle, and since the reinforcement element is arranged via its first attachment region on the main floor element and via its second attachment region on the upper flange, the second attachment region is an upper attachment region, while the first attachment region is a lower attachment region, which is arranged lower than the second attachment region in the vertical direction of the vehicle.

In order to be able to reinforce the crossmember element, in particular the upper flange, in a particularly advantageous manner by means of the reinforcement element, the reinforcement element is attached to the upper flange, in particular directly, via the second attachment region and the third attachment region, in particular of the reinforcement element. It is provided here that the third attachment region is at least partially, in particular at least predominantly or completely, spaced apart from the second attachment region in the longitudinal direction of the vehicle. The second attachment region and the third attachment region are formed, for example, by respective joining flanges of the reinforcement element, which is attached, in particular directly, for example to the upper flange via its joining flanges. For example, the reinforcement element is connected to the upper flange, i.e., attached to the upper flange, by means of the second and/or third attachment region in an integrally bonded and/or a frictional engaged and/or a form-fitting manner. In particular, it is conceivable that the reinforcement element is welded and/or glued and/or screwed and/or riveted to the upper flange via the second and/or third attachment region. The same can be applied to the attachment of the reinforcement element by the first attachment region to the main floor element. It is conceivable that the reinforcement element is connected to the main floor element by means of the first attachment region in an integrally bonded and/or integrally bonded and/or form-fitting manner. For example, the reinforcement element is welded and/or glued and/or screwed and/or riveted to the main floor element via the first attachment region.

Due to the reinforcement of the upper flange implemented by means of the reinforcement element and due to the described attachment of the reinforcement element both to the upper flange and to the main floor element, a torque-resistant, e.g., frictionally engaged, support of the upper flange can be realized on the main floor element, in particular downwardly in the vertical direction of the vehicle, so that a particularly advantageous accident behaviour can be provided.

A further embodiment is distinguished in that the second attachment region is arranged at least partially, in particular at least predominantly or completely, in front of the first attachment region in the longitudinal direction of the vehicle, while preferably the third attachment region is arranged at least partially, in particular at least predominantly or completely, behind the first attachment region in the longitudinal direction of the vehicle. This allows at least or exactly double shear, for example frictionally engaged, torque-resistant support of the upper flange in relation to or on the main floor element, so that both the energy store and the passengers can be advantageously protected, in particular in the event of a side impact.

In order to be able to realize a particularly advantageous rigidity of the profile in a particularly weight-efficient manner, it is provided in a further embodiment of the invention that the crossmember element has side flanges by which the closed hollow cross section is limited on both sides in the longitudinal direction of the vehicle. This means that the closed hollow cross section is delimited towards the front in the longitudinal direction of the vehicle by a first of the side flanges and towards the rear in the longitudinal direction of the vehicle by a second of the side flanges. The side flanges are connected to the upper flange and are thus connected to each other via the upper flange. In particular, it is conceivable that the side flanges are formed in one piece with the upper flange. For example, the crossmember element is made of a metal material and/or of sheet metal.

It has proven to be particularly advantageous here if the reinforcement element is attached to at least one of the side flanges, in particular directly, via at least one further attachment region. In this way, the crossmember element can be designed particularly effectively and efficiently. In addition, a particularly torque-resistant support of the crossmember element on or in relation to the main floor element, in particular a frictionally engaged support, can be provided. It is conceivable here that the reinforcement element is connected via its further attachment region in a frictionally engaged and/or form-fitting and/or integrally bonded manner to the one side flange. In particular, the reinforcement element can be welded and/or glued and/or screwed and/or riveted to the one side flange via the further attachment region.

A particularly high rigidity of the profile and thus of the floor structure as a whole can be achieved in a particularly weight-, installation-space- and cost-efficient manner by the reinforcement element having, for example, a further hollow cross section which is open per se, i.e., considered on its own, upwardly in the vertical direction of the vehicle, and which is supplemented by the upper flange to form a further, closed hollow cross section.

Lastly, it has proven to be particularly advantageous if the energy store is at least partially, in particular at least predominantly or completely, covered by the side sills outwardly on both sides in the transverse direction of the vehicle. This makes it possible, for example, to avoid direct contact between the energy store and a collision obstacle, which is also referred to as another involved party of an accident and which, particularly within the scope of a side impact in the transverse direction of the vehicle, impacts against the vehicle from the outside to the inside and at the same time in particular against the body, since the collision obstacle only comes into contact with one of the side sills. This means that impact or accident energy can be absorbed particularly advantageously by one of the side sills and guided around the energy store via the crossmember element. In this way, the energy store can be protected in a particularly advantageous way.

The crossmember element or the profile is, for example, part of a crossmember structure which is arranged on the side of the main floor element facing upwards in the vertical direction of the vehicle and thus away from the energy store. The crossmember structure thus comprises the crossmember element and preferably at least one further crossmember element which follows the first crossmember element in the longitudinal direction of the vehicle and is spaced apart from the first crossmember element. Here, the following and previous explanations regarding the first crossmember element can also be transferred readily to the further crossmember element, and vice versa. Preferably, the crossmember structure comprises more than two crossmember elements to which the previous and following explanations regarding the first and second crossmember elements can be readily transferred.

The invention also makes it possible to create a modular construction kit system by means of which the floor structure can be modified in a modular and simple manner and thus adapted to different vehicles or vehicle derivatives as required, in particular in such a way that the respective energy stores of the respective vehicle derivatives can be advantageously protected by means of the respective floor structure. In particular, the construction kit system makes it possible to modify the floor structure at corresponding positions or points in order to advantageously protect both the respective energy store and the passenger cell or passengers in the different vehicle derivatives. This is particularly advantageous for vehicles or vehicle derivatives that are based on a common platform but, compared to a basic vehicle, have, for example, increased requirements with regard to vehicle mass, high-voltage safety, protection of electrical components, passenger safety and/or dimensional concept variations, in particular with regard to wheelbases and/or overhangs. By means of the construction kit system, the floor structure for the respective vehicle derivatives can in particular thus be modified, i.e., by means of the construction kit system, different construction variants of the floor structure can in particular be created for the respective vehicle derivatives by adapting the floor structure, also referred to as the underbody structure, to the different positions, resulting for example from the above-mentioned requirements, of a respective vehicle centre of gravity and thus also to different rotational behaviour of the respective vehicle derivative and its centre of gravity resulting during a side impact with another party involved in the accident or with a crash barrier, and thus also to different loads on the upper flange, as a result of which a particularly advantageous level of safety in the event of a side impact can be achieved in a weight- and cost-efficient manner. The floor structure can, in particular with the respective vehicle derivative, prevent excessive buckling or collapse of the crossmember structure and of the main floor element and thus excessive intrusion into the space previously mentioned and also referred to as the energy store installation space.

The modular construction kit system or the different construction variants of the floor structure can be realized, for example, by varying the number of crossmember elements and/or by varying the number of reinforcement elements and/or by varying the partial region over which the respective reinforcement element extends. Thus, for example, in a first of the vehicle derivatives, the partial region over which the reinforcement element extends may be larger or smaller than in a second of the vehicle derivatives. Alternatively or additionally, the modular construction system or the different construction variants of the floor structure can be realized by material grades and/or material thicknesses and/or material cross section variation of the reinforcement element and/or by variation of the number and/or size of joint connections by means of which the respective attachment region is attached to the upper flange or side flange or to the main floor element. Overall, the following advantages can be realized by the invention:

- advantageous passenger safety
- range optimisation, especially for a battery-electric vehicle
- cost and weight optimisation through modularisation for different vehicle versions or derivatives that are based for example on a common platform and for example have different drive technologies
- particularly advantageous protection of the energy store or particularly advantageous high-voltage safety A second aspect of the invention relates to a body, in particular a self-supporting body, for a vehicle. The body has a floor structure according to the first aspect of the invention. Advantages and advantageous embodiments of the first aspect of the invention are to be regarded as advantages and advantageous embodiments of the second aspect of the invention, and vice versa.

A third aspect of the invention relates to a vehicle, in particular formed as a motor vehicle, which has a body, in particular a self-supporting body, which has a floor structure in accordance with the first aspect of the invention. Advantages and advantageous embodiments of the first aspect and of the second aspect of the invention are to be regarded as advantages and advantageous embodiments of the third aspect of the invention, and vice versa.

Further advantages and details of the invention will become apparent from the following description and from the drawings.

DETAILED DESCRIPTION OF THE DRAWINGS

In the figures, like parts are provided with like reference signs, and therefore reference is made to the previous description in this regard.

Figure 1:
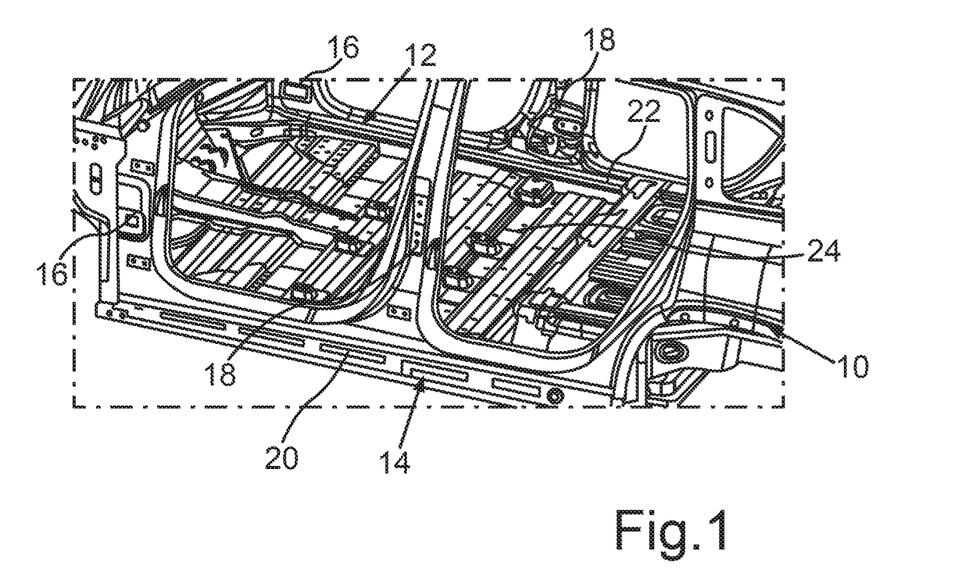
FIG. 1 shows a schematic perspective view of part of a self-supporting body for a vehicle formed as a passenger car, comprising a floor structure having a main floor element and a crossmember structure which is disposed on an upper side of the main floor element and has crossmember elements, which delimit respective closed hollow cross sections in which respective reinforcement elements are disposed.

FIG. 1 shows a schematic perspective view of part of a self-supporting body 10 for a vehicle formed as a passenger car. The vehicle is a motor vehicle and, in its fully assembled state, has at least one or exactly one drive motor by means of which the vehicle can be driven. The drive motor can be an internal combustion engine or an electric machine by means of which the motor vehicle can be driven, in particular fully, electrically. Thus, the vehicle can be formed as a hybrid vehicle or as an electric vehicle, in particular as a battery-electric vehicle (BEV). The body 10 delimits an interior 12, also referred to as a passenger cell or passenger compartment, in which persons, i.e., passengers, can be present during a journey of the vehicle. The body 10 has a floor structure 14 from which vehicle pillars 16 and 18 of the body 10 extend upwards in the vertical direction of the vehicle. While the vehicle pillars 16 are respective A-pillars, the vehicle pillars 18 are respective B-pillars.

Figure 2:
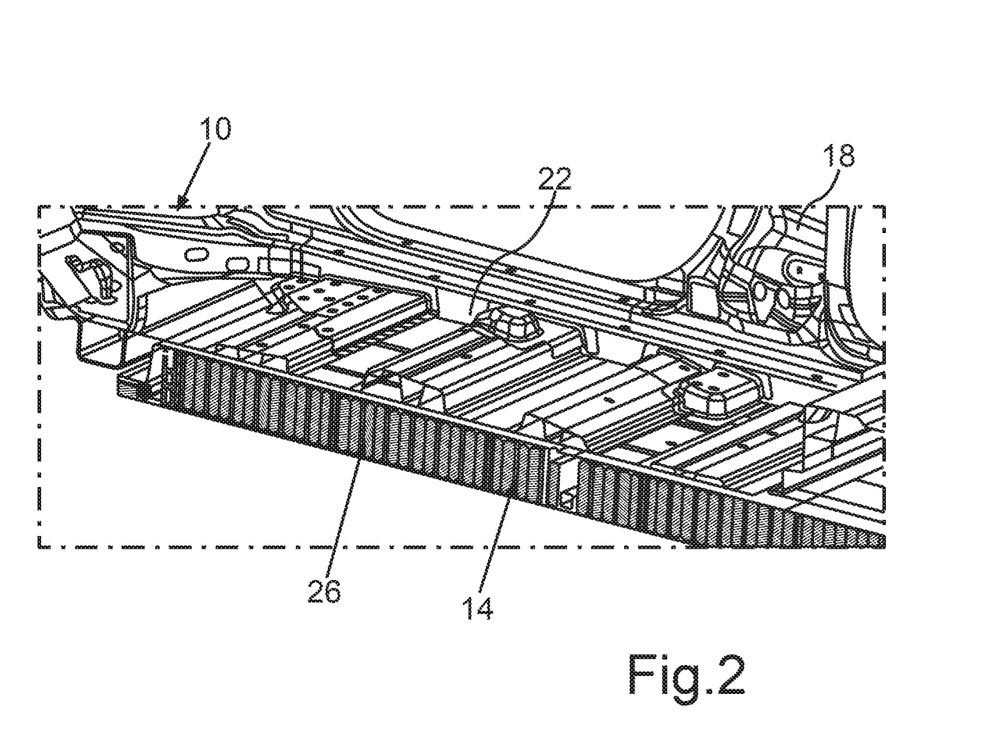
FIG. 2 shows a schematic and sectional perspective view of part of the car body.
Figure 3:
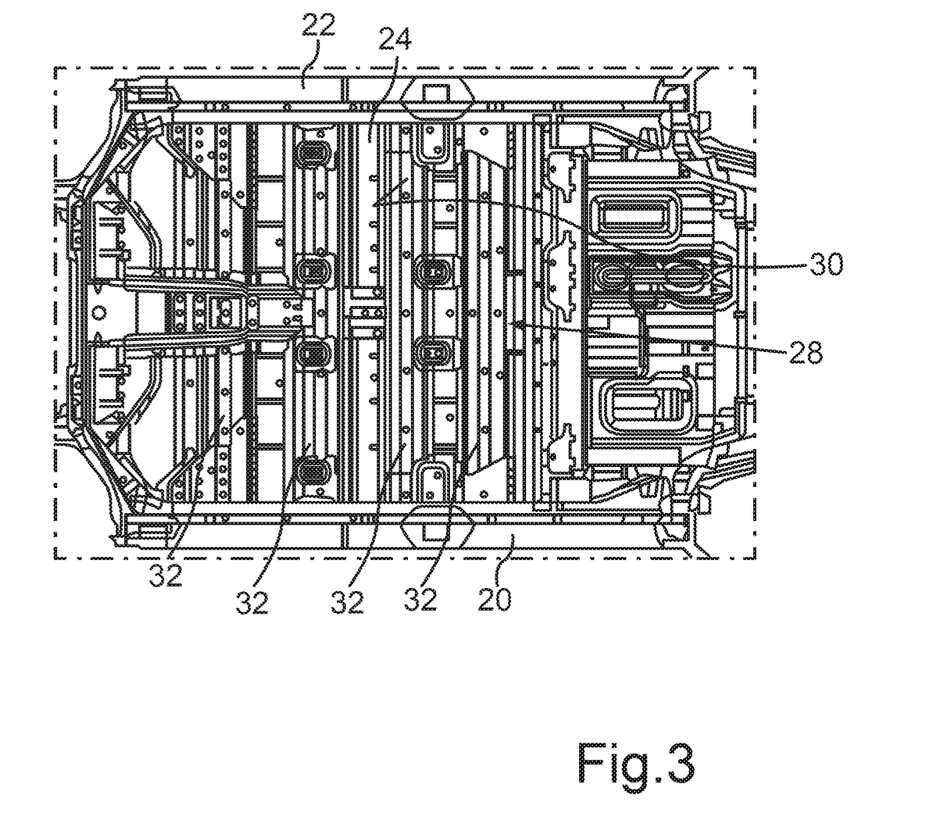
FIG. 3 shows a schematic plan view of the floor structure.
Figure 4:
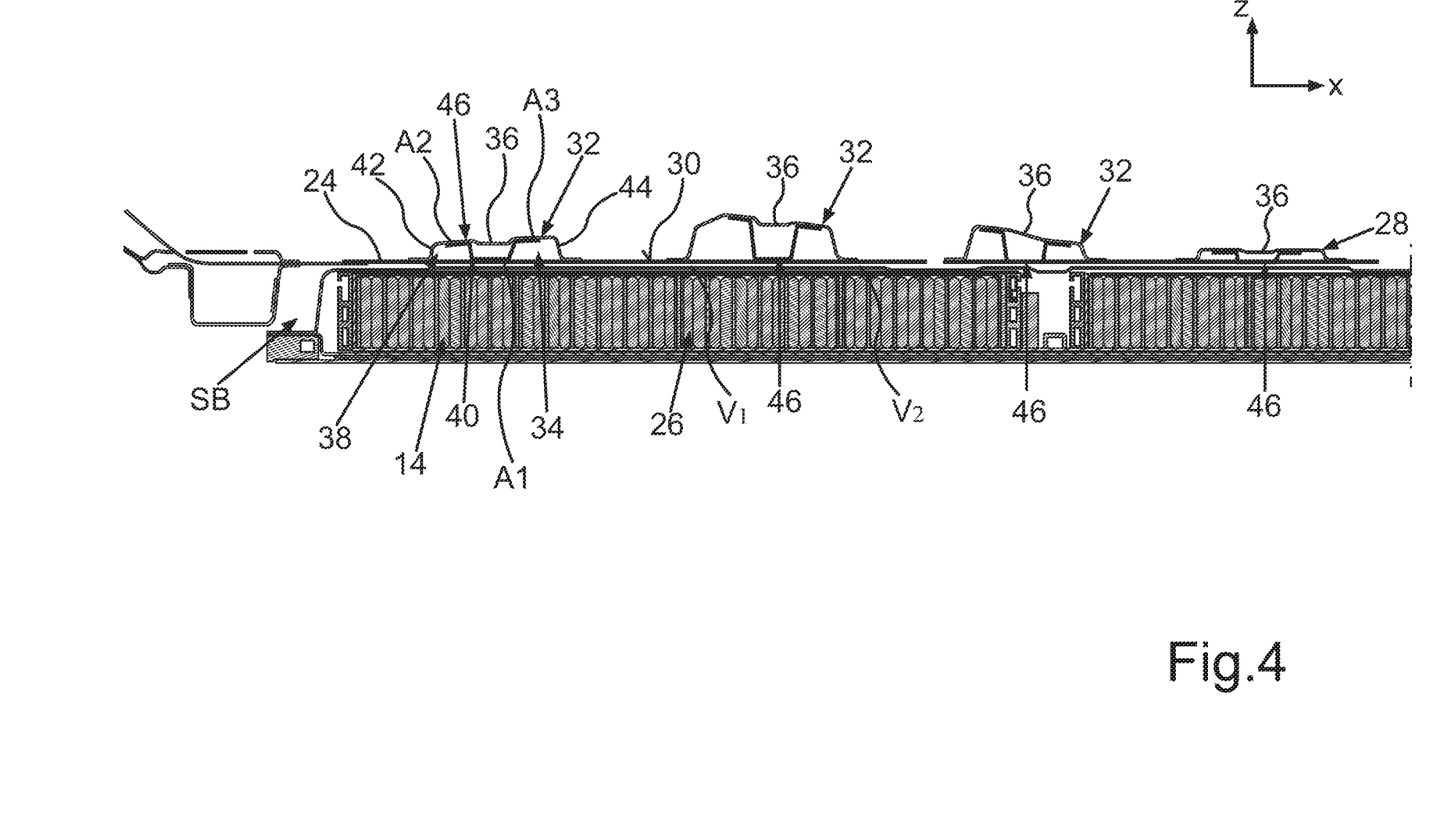
FIG. 4 shows a schematic sectional view of part of a first embodiment of the floor structure along a sectional plane running in the vertical direction of the vehicle and in the transverse direction of the vehicle.

As can be seen when viewed together with FIGS. 2 to 4, with FIGS. 4 to 7 showing a first embodiment of the floor structure 14, the floor structure 14 comprises two side sills 20 and 22 which are spaced apart from each other in the transverse direction of the vehicle and to which, for example, the vehicle pillars 16 and 18 are connected, in particular directly. The floor structure 14 also comprises a main floor element 24 arranged in the transverse direction of the vehicle (y-direction in the vehicle coordinate system) between the side sills, which is also referred to as the main floor. The main floor element 24 is formed, for example, as a sheet metal component and is therefore also referred to as a main floor sheet. In the fully produced state of the body 10, in particular of the vehicle as a whole, the interior 12 is delimited downwardly in the vertical direction of the vehicle (z-direction in the vehicle coordinate system) at least partially, in particular at least predominantly or completely, by the main floor element 24, which is, for example, at least substantially planar. The main floor element 24 is arranged in the transverse direction of the vehicle between the side sills 20 and 22 and is attached, for example in each case, in particular directly, to the side sills 20 and 22.

Figure 8:
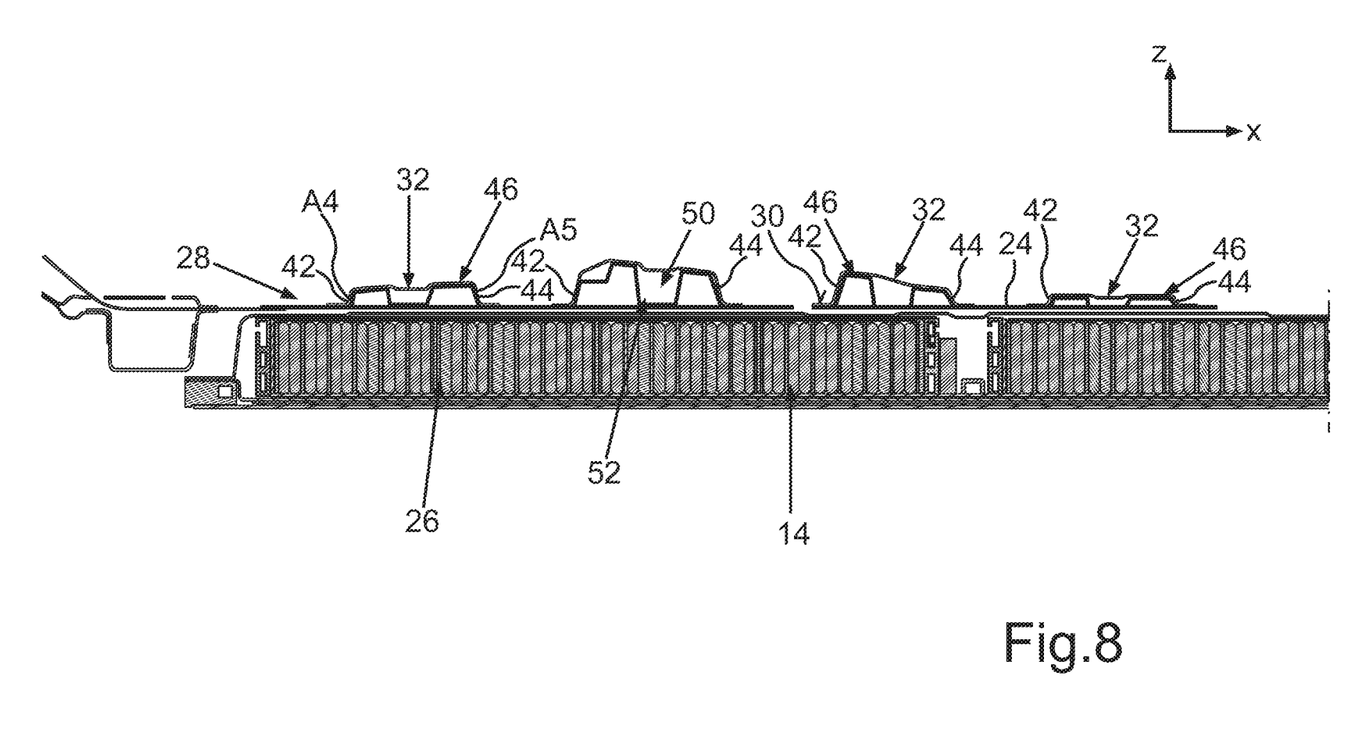
FIG. 8 shows a schematic sectional view of part of a second embodiment of the floor structure along a sectional plane running in the vertical direction of the vehicle and in the longitudinal direction of the vehicle.

Furthermore, the floor structure 14 comprises at least one energy store 26, which is arranged under the main floor element 24 in the vertical direction of the vehicle and which, in the exemplary embodiment shown in FIGS. 1 to 3 and in the first embodiment and in a second embodiment of the floor structure 14 shown in FIG. 8, is formed as an electrical energy store, i.e., as an energy store for storing electrical energy, in particular electrical current. For example, the energy store 26 is a battery, in particular a high-voltage battery. Again expressed in other words, the energy store 26 may comprise at least one electrical energy store for storing electrical energy, in particular electrical current. Alternatively or additionally, the energy store 26 may comprise at least one fuel tank, in which a gaseous or liquid fuel, also referred to as propellant, can be received or is received and thus retained or stored. In order to drive the vehicle by means of the drive motor, the drive motor is supplied with the electrical energy stored in the energy store 26 or with the fuel stored in the energy store 26.

In addition, the floor structure 14 comprises a crossmember structure 28 which is arranged—in particular completely—on an upper side 30 of the main floor element 24 which faces upwards in the vertical direction of the vehicle and thus away from the energy store 26 and a roadway located therebelow. The upper side thus faces a passenger compartment. The crossmember structure 28 extends in the transverse direction of the vehicle between the side sills 20 and 22 and comprises several crossmember elements 32 arranged on the upper side 30. The respective crossmember element 32 extends in or at least substantially in the transverse direction of the vehicle between the side sills 20 and 22. It can be seen particularly well from FIG. 4 that the respective crossmember element 32 per se, i.e., considered on its own, has a hollow cross section 34 which is open downwardly in the vertical direction of the vehicle and is delimited upwardly in the vertical direction of the vehicle by a respective upper flange 36 of the respective crossmember element 32. The respective hollow cross section 34, which is open per se, is supplemented by the main floor element 24 to form a closed hollow cross section 38, so that the respective crossmember element 32 and the main floor element 24 form a profile 40 which has the closed hollow cross section 38 and is also referred to as a hollow profile. The respective crossmember element 32 also has at least or exactly two side flanges 42 and 44, which are arranged one behind the other in the longitudinal direction of the vehicle (x-direction in the vehicle coordinate system) and are formed in one piece with the upper flange 36 and in one piece with each other. The open hollow cross section 34 and the closed hollow cross section 38 are delimited on both sides in the longitudinal direction of the vehicle by the side flanges 42 and 44. In the present case, the hollow cross sections 34 and 38 are delimited towards the front in the longitudinal direction of the vehicle by the side flange 42 and towards the rear in the longitudinal direction of the vehicle by the side flange 44, in particular at least partially, at least predominantly or completely. In FIGS. 2 to 8, the longitudinal direction of the vehicle is denoted by x, with the vertical direction of the vehicle being denoted by z and the transverse direction of the vehicle being denoted by y.

It remains to be noted that the respective crossmember element 32 according to the exemplary embodiment shown in FIG. 4 has a cross section that is U-shaped or also hat-shaped. The same applies to the respective reinforcement element 46, which also has a hat-shaped or U-shaped cross section, here the upper flange of the respective reinforcement element 46 being brought into contact with the main floor element 24, while the side flanges of the reinforcement element 46, which are connected to each other via the upper flange or base flange, are attached to the upper flange of the crossmember element 32 and support these relative to the main floor element. In another exemplary embodiment of the crossmember element 32, this has several hollow profile cross sections after it has been placed on the main floor, these hollow cross sections each preferably being closed per se.

In order to be able to design the floor structure 14, which is also referred to as the underbody structure, in a particularly installation-space-, weight- and cost-efficient and modularly adaptable manner and in order to be able to realize a particularly advantageous accident behaviour of the floor structure 14 and thus of the body 10 and of the vehicle as a whole, at least one or exactly one reinforcement element 46 is arranged in the respective, closed hollow cross section 38 and extends in the transverse direction of the vehicle (y) at least over a respective partial region of the respective crossmember element 32 and is formed, for example, from a metal material. The respective reinforcement element 46 is attached, in particular directly, to the main floor element 24 via at least a first attachment region A1 of the respective reinforcement element 46 to reinforce at least the respective upper flange 36 and thus the crossmember element 32. Furthermore, the respective reinforcement element 46 is attached, in particular directly, to the upper flange 36 via at least one second attachment region A2 of the respective reinforcement element 46, whereby a torque-resistant, in particular frictionally engaged support of the respective upper flange 36 to the main floor element 24 can be provided. The attachment regions A1 and A2 are at least partially, in particular at least predominantly or completely, offset from each other here in the longitudinal direction of the vehicle.

In order to be able to reinforce the respective upper flange 36 and thus the respective crossmember element 32 in a particularly advantageous manner, the reinforcement element 46 is also attached to the upper flange 36, in particular directly, via at least one third attachment region A3 of the respective reinforcement element 46, which is spaced apart from the second attachment region A2 in the longitudinal direction of the vehicle. In this case, the attachment regions A2 and A3 are arranged higher up in the vertical direction of the vehicle than the attachment region A1. Furthermore, the attachment region A2 is arranged at least partially, in particular at least predominantly or completely, in front of the first attachment region A1 in the longitudinal direction of the vehicle (x), while the respective third attachment region A3 is arranged at least partially, in particular at least predominantly or completely, behind the first attachment region A1 in the longitudinal direction of the vehicle (x). In this way, an advantageous, double shear, in particular frictionally engaged, torque-resistant support of the upper flange 36 in relation to the main floor element 24 can be ensured. It can be seen particularly well from FIG. 4 that the attachment regions A2 and A3 are formed, for example, by respective joining flanges of the reinforcement element 46, the reinforcement element 46 being attached to the upper flange 36 via its joining flanges. Furthermore, it can be seen that the wall forming the attachment region A1 is connected to the joining flanges via respective side walls of the reinforcement element 46, so that the respective upper flange 36 can be supported on the main floor element 24 in a particularly advantageous manner via the joining flanges, the side walls and the wall of the respective reinforcement element 46.

It remains to be noted that the reinforcement element 46 has an upper flange or, due to its attachment to the main floor element, a lower flange or base flange, which connects the two side flanges of the reinforcement element 46 to each other. The side flanges of the reinforcement element 46, which run approximately in the vertical direction, i.e., parallel or substantially parallel to the vertical direction of the vehicle (z-direction in the vehicle coordinate system), thus form a vertical or approximately vertical support of the crossmember upper flange with respect to the main floor element 24.

The energy store 26 is arranged in an energy store region SB, also referred to as a space or energy store space, which is delimited upwardly in the vertical direction of the vehicle by the main floor element 24 and, for example, on both sides in the transverse direction of the vehicle by the side sills 20 and 22. The crossmember structure 28 arranged on the upper side 30 can advantageously protect both the energy store 26 and the passengers, in particular in the event of a side impact, so that crossmember structures arranged under the main floor element 24 in the vertical direction of the vehicle, i.e., crossmember structures interrupting the energy store region SB, can be avoided.

The respective crossmember element 32 is in turn attached to the main floor element 24, i.e., connected to the main floor element 24, in particular directly, via at least or exactly two connection regions V1 and V2, in particular of the respective crossmember element 32, which follow each other in the longitudinal direction of the vehicle and are preferably spaced apart from each other. In this case, the connection region V1 is arranged further forward in the longitudinal direction of the vehicle than the connection region V2. The connection regions V1 and V2 are formed, for example, by respective, further joining flanges of the respective crossmember element 32, which is attached, for example, via a respective, further joining flange, in particular directly, to the main floor element 24, in particular in an integrally bonded and/or frictionally engaged and/or form-fitting manner.

Figure 5:
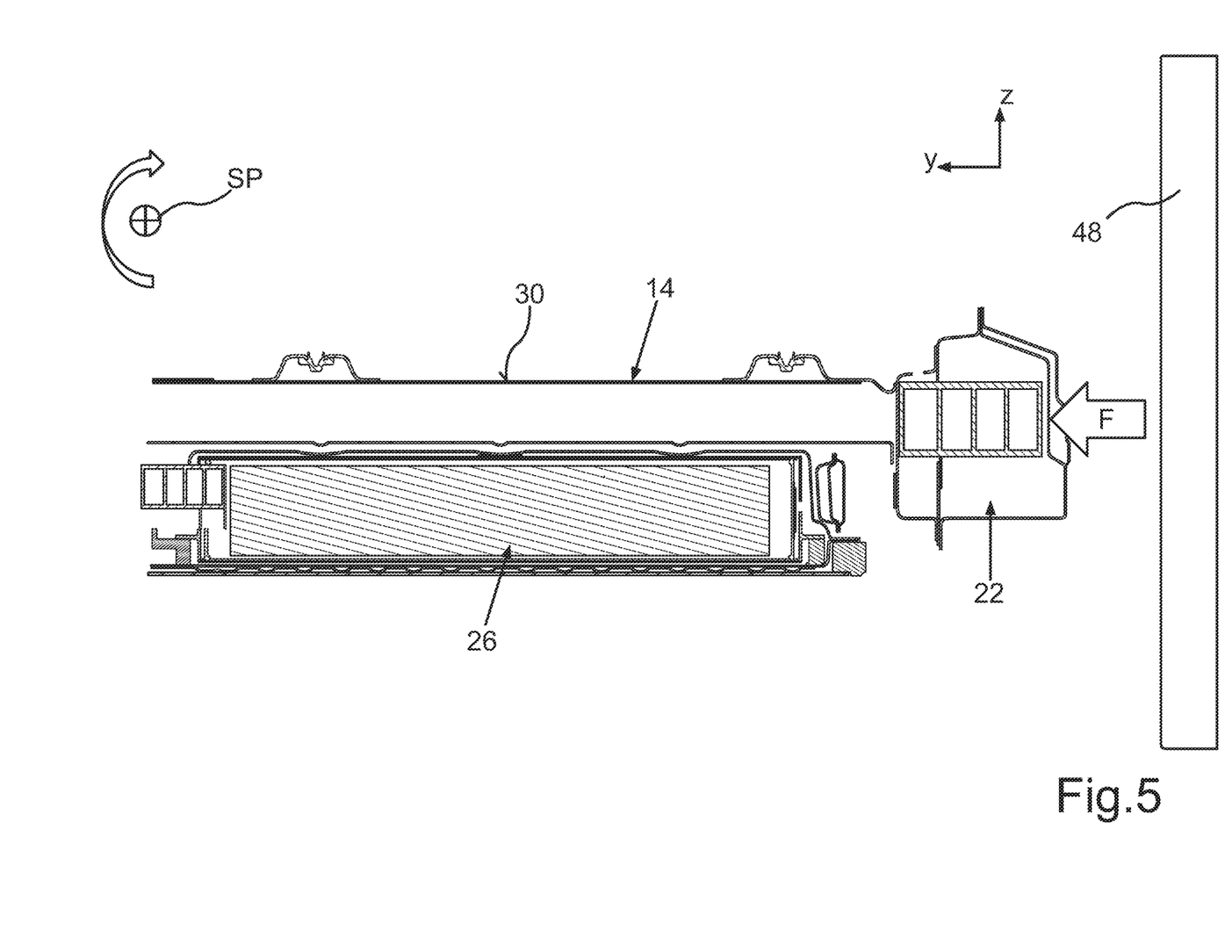
FIG. 5 shows a schematic sectional view of part of the floor structure according to FIG. 4 along a sectional plane running in the vertical direction of the vehicle and in the transverse direction of the vehicle during a side impact.
Figure 6:
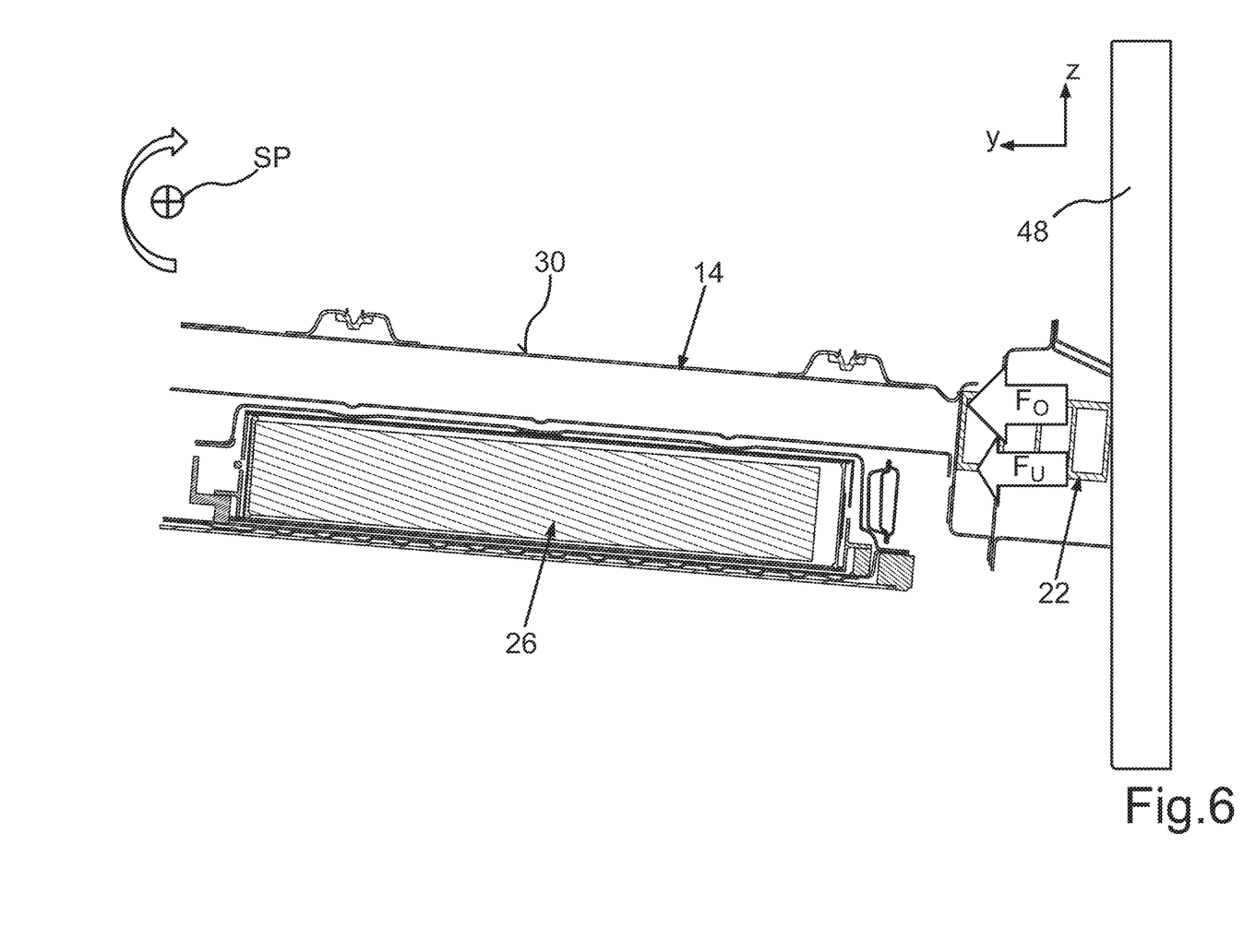
FIG. 6 shows a further schematic sectional view of part of the floor structure according to FIG. 5 in the further course of the side impact.

FIGS. 5 and 6 show the floor structure 14 in the event of a side impact, during the course of which a crash barrier 48 or another party involved in the accident impacts against the body 10 in the transverse direction of the vehicle and, in the process, impacts against the side sill 22, for example. As a result, the floor structure 14 is subjected to an accident-induced force, which is illustrated in FIG. 5 by a force arrow F and acts in the transverse direction of the vehicle from the outside to the inside, causing the floor structure to be at least partially deformed and/or displaced. The centre of gravity of the vehicle is denoted SP in FIGS. 5 and 6, with an arrow illustrating the rotational behaviour of the vehicle about its centre of gravity SP resulting from the accident-induced application of force.

By means of the floor structure 14, the accident-induced application of force is divided, for example, into two force components $F_O$ and $F_U$ arranged one above the other in the vertical direction of the vehicle, with the energy store 26 and the passengers can be advantageously protected by the floor structure 14. While FIG. 5 shows the floor structure 14 before the impact of the crash barrier 48 on the body 10, FIG. 6 shows the floor structure 14 during the impact or in the course of the impact. The arrows in FIG. 6 indicate that the upper force component $F_O$ is greater than the lower force component $F_U$, which can be achieved by designing the floor structure 14 accordingly. In this way, the energy store 26 can be protected particularly advantageously, as can the passengers.

Figure 7:
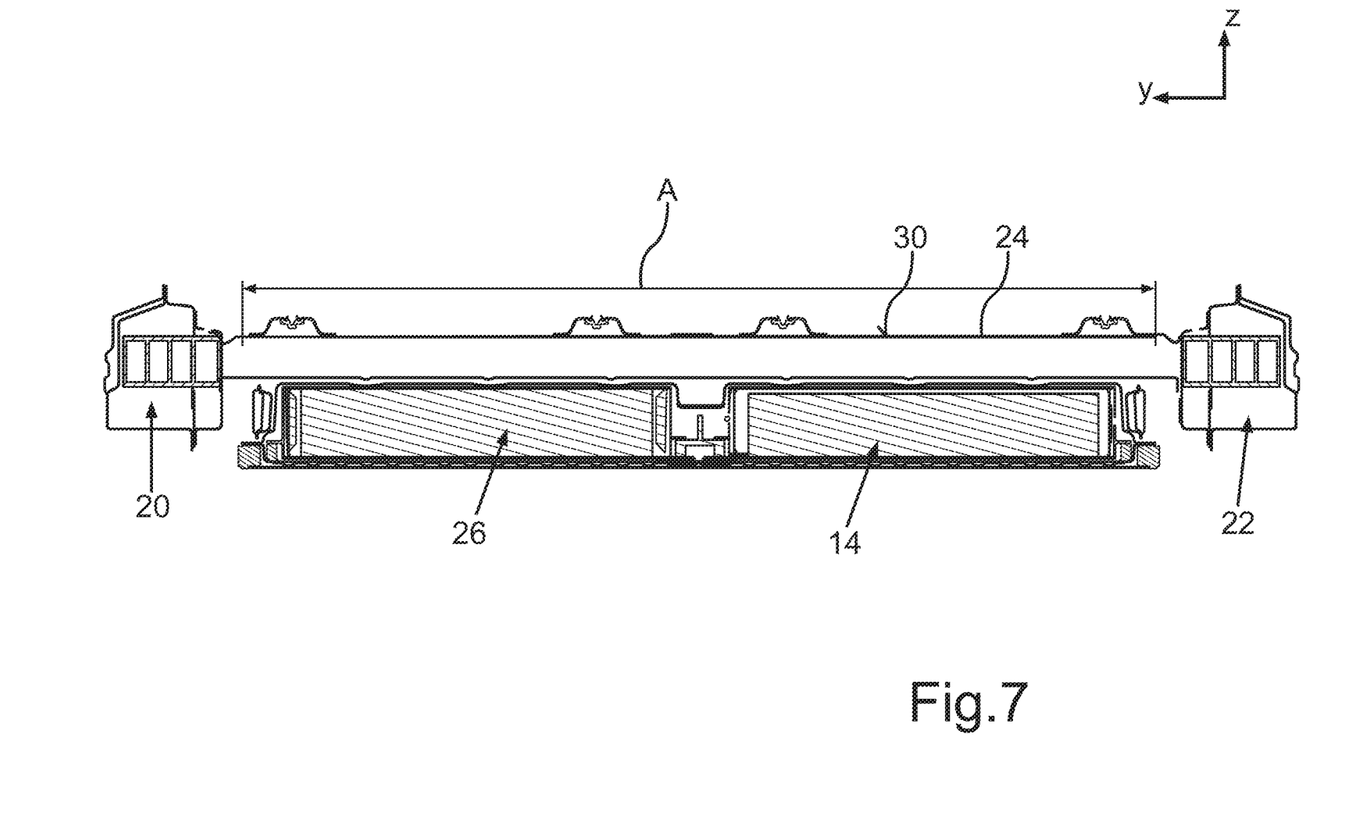
FIG. 7 shows a schematic sectional view of the floor structure along a sectional plane running in the vertical direction of the vehicle and in the transverse direction of the vehicle.

In FIG. 7, A illustrates an extent, in the transverse direction of the vehicle (y) and also referred to as an expanse, of the respective crossmember element 32, also referred to as the floor crossmember. It can be seen that the extent A is particularly large and runs over the predominant width of the main floor element 24 running in the longitudinal direction of the vehicle. In particular, at least a partial region of the energy store 26 is overlapped or covered by the respective crossmember element 32 upwardly over its entire width running in the transverse direction of the vehicle in the vertical direction of the vehicle.

In the second embodiment, the respective reinforcement element 46 has at least or exactly two further attachment regions A4 and A5, which are preferably formed in one piece with the attachment regions A1, A2 and A3. The respective reinforcement element 46 is attached to the respective side flanges 42 and 44 of the respective crossmember element 32 via the attachment regions A4 and A5, in particular in such a way that the respective reinforcement element 46 is attached via its attachment region A4, in particular directly, to the side flange 42. Alternatively or additionally, the respective reinforcement element 46 is attached via its respective attachment region A5, in particular directly, to the respective side flange 44. In this way, a particularly advantageous reinforcement and support of the crossmember element 32 can be provided.

In order to be able to protect the energy store 26 in a particularly advantageous manner, it is also provided that the energy store 26 is at least partially overlapped or covered outwardly on both sides in the transverse direction of the vehicle (y) by the side sills 20 and 22. This allows accident or impact energy to be guided around the energy store 26 in a particularly advantageous manner, so that excessive loads and thus undesirable damage to the energy accumulator 26 can be avoided.

Lastly, it can be seen from FIGS. 7 and 8 that the respective reinforcement element 46 has at least one further hollow cross section 50 that is open per se, i.e., when the reinforcement element 46 is considered alone in the vertical direction of the vehicle, which is supplemented by the upper flange 36 to form a respective further closed hollow cross section 52. In this way, a particularly high rigidity of the floor structure 14 can be realized in a particularly installation-space-, weight- and cost-efficient manner.

Figure 9:
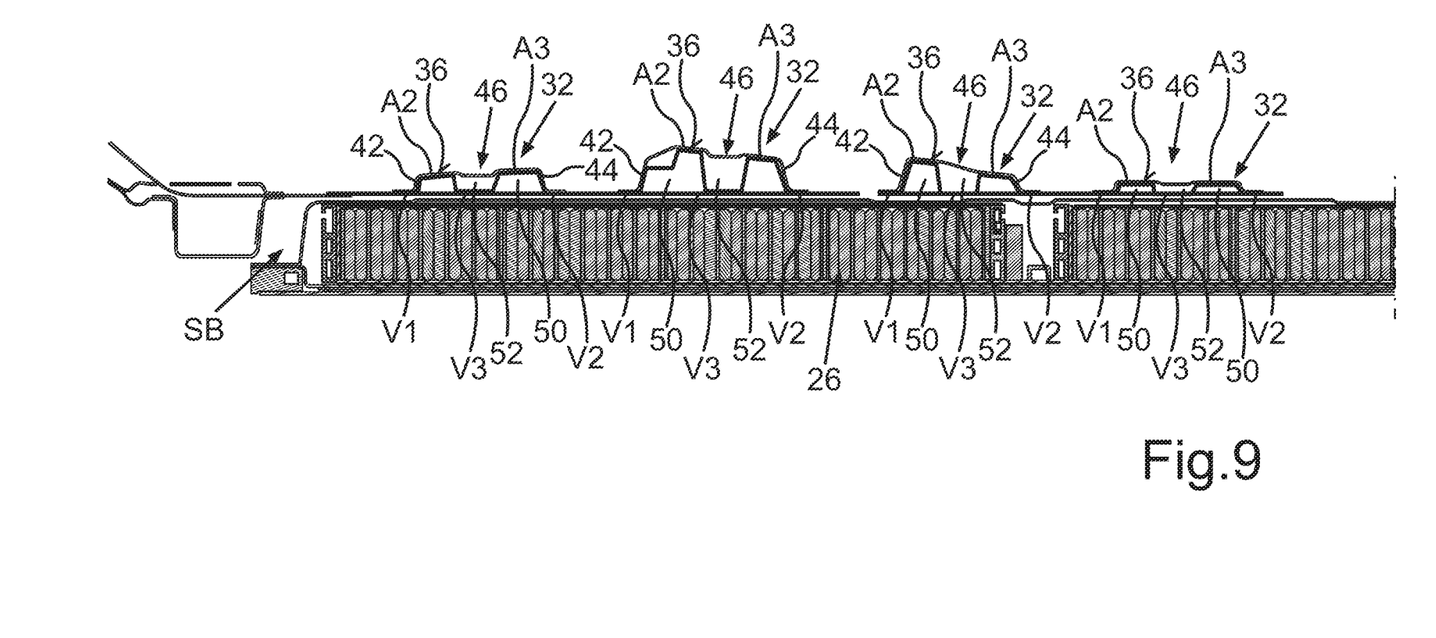
FIG. 9 shows a schematic sectional view of part of a third embodiment of the floor structure along a sectional plane running in the vertical direction of the vehicle and in the transverse direction of the vehicle.
Figure 10:
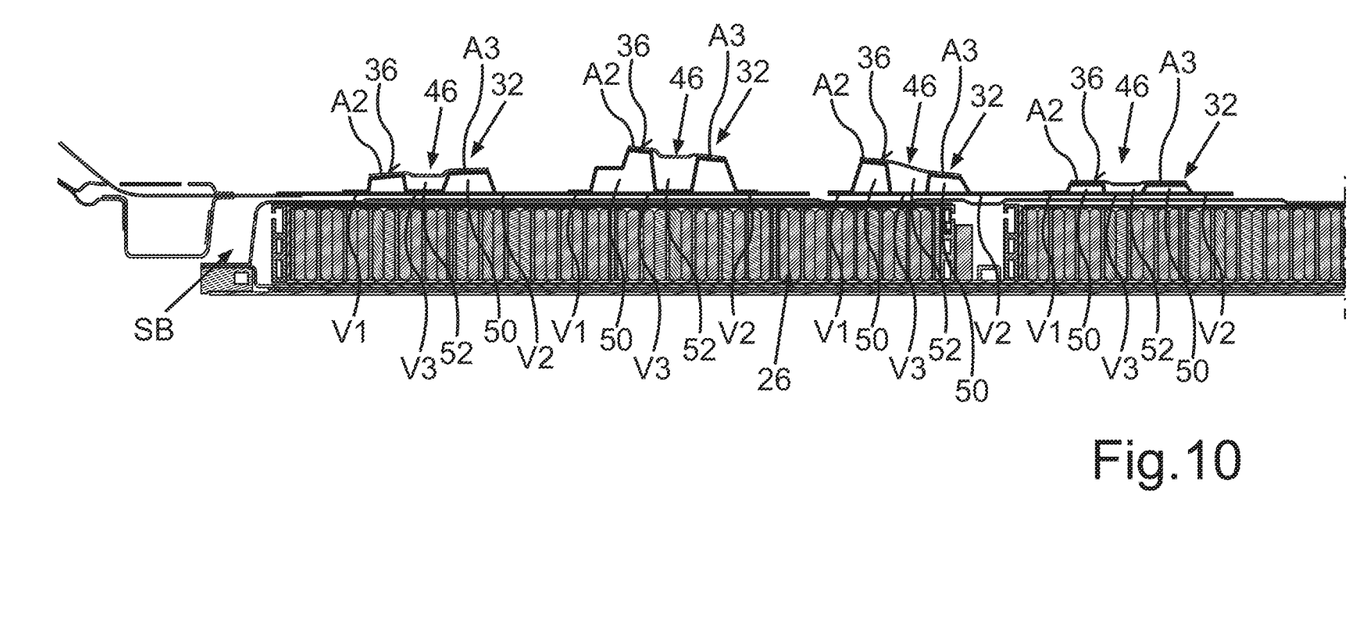
FIG. 10 shows a schematic sectional view of part of a fourth embodiment of the floor structure along a sectional plane running in the vertical direction of the vehicle and in the transverse direction of the vehicle.

FIGS. 9 and 10 each show a further exemplary embodiment of the crossmember element 32 and the reinforcement element 46, which differ from the previous exemplary embodiments in particular in that the reinforcement element 46 is placed on the crossmember element 36 from the vehicle interior, i.e., the reinforcement element 46 is not directly attached here to the main floor element 24, but only to the crossmember element 36 or to its upper flange 36 (exemplary embodiment according to FIG. 10) and, in the exemplary embodiment according to FIG. 9, additionally also to the lateral edge regions 42, 44 of the crossmember element 36 in the transition region from the upper flange 36 to the main floor element 24. The respective crossmember element 32 is in turn attached to the main floor element 24 via connection regions V1, V2 and V3, in particular of the respective crossmember element 32, which follow each other in the longitudinal direction of the vehicle and are spaced apart from each other.

The invention claimed is:

1. A floor structure for a body (10) of a vehicle, comprising:
   two side sills (20, 22) spaced apart from each other in a transverse direction of the vehicle (y);
   a main floor element (24) which is disposed between the two side sills (20, 22);
   an energy store (26) disposed under the main floor element (24) in a vertical direction of the vehicle (z) for storing electrical energy and/or a fuel;
   a crossmember element (32) which is disposed on an upper side (30) of the main floor element (24) facing upwards in the vertical direction of the vehicle (z) and away from the energy store (26) and which extends in the transverse direction of the vehicle (y) between the two side sills (20, 22), wherein a hollow cross section (34) of the crossmember element which is open downwardly in the vertical direction of the vehicle (z) and is delimited upwardly in the vertical direction of the vehicle (z) by an upper flange (36) of the crossmember element (32) is supplemented by the main floor element (24) to form a first closed hollow cross section (38); and
   a reinforcement element (46), wherein the reinforcement element (46) extends in the transverse direction of the vehicle (y) at least over a partial region of the crossmember element (32);
   wherein the reinforcement element (46) is attached to the main floor element (24) via a first attachment region (A1) and is attached to the upper flange (36) via a second attachment region (A2) and a third attachment region (A3) which are disposed at a distance from each other in the longitudinal direction of the vehicle (x).

2. A floor structure for a body (10) of a vehicle, comprising:
   two side sills (20, 22) spaced apart from each other in a transverse direction of the vehicle (y);
   a main floor element (24) which is disposed between the two side sills (20, 22);
   an energy store (26) disposed under the main floor element (24) in a vertical direction of the vehicle (z) for storing electrical energy and/or a fuel;
   a crossmember element (32) which is disposed on an upper side (30) of the main floor element (24) facing upwards in the vertical direction of the vehicle (z) and away from the energy store (26) and which extends in the transverse direction of the vehicle (y) between the two side sills (20, 22), wherein a hollow cross section (34) of the crossmember element which is open downwardly in the vertical direction of the vehicle (z) and is delimited upwardly in the vertical direction of the vehicle (z) by an upper flange (36) of the crossmember element (32) is supplemented by the main floor element (24) to form a first closed hollow cross section (38); and
   a reinforcement element (46), wherein the reinforcement element (46) extends in the transverse direction of the vehicle (y) at least over a partial region of the crossmember element (32);
   wherein the reinforcement element (46) reinforces the crossmember element (32) and is disposed on the crossmember element (32) from an outside, wherein the crossmember element (32) and the reinforcement element (46) have a first connection point on the upper flange (36) and a second connection point in a region between the upper flange (36) and the main floor element (24), wherein a first closed hollow cross section (38) is delimited by the crossmember element (32) and the reinforcement element (46);
   wherein the crossmember element (32) has two side flanges (42, 44) via which the closed hollow cross section (38) is delimited on both sides in the longitudinal direction of the vehicle (x).

3. The floor structure according to claim 1, wherein the first attachment region (A1) and the second attachment region (A2) are at least partially offset from each other in the longitudinal direction of the vehicle (x).

4. The floor structure according to claim 1, wherein the second attachment region (A2) is disposed at least partially in front of the first attachment region (A1) in the longitudinal direction of the vehicle (x) and the third attachment region (A3) is disposed at least partially behind the first attachment region (A1) in the longitudinal direction of the vehicle (x).

5. The floor structure according to claim 1, wherein the crossmember element (32) has two side flanges (42, 44) via which the first closed hollow cross section (38) is delimited on both sides in the longitudinal direction of the vehicle (x).

6. The floor structure according to claim 5, wherein the reinforcement element (46) is attached to at least one of the two side flanges (42, 44) via a fourth attachment region (A4).

7. The floor structure according to claim 1, wherein the reinforcement element (46) has a hollow cross section (50) which is open upwardly in the vertical direction of the vehicle (z) and which is supplemented by the upper flange (36) to form a second closed hollow cross section (52).

8. A floor structure for a body (10) of a vehicle, comprising:
   two side sills (20, 22) spaced apart from each other in a transverse direction of the vehicle (y);
   a main floor element (24) which is disposed between the two side sills (20, 22);
   an energy store (26) disposed under the main floor element (24) in a vertical direction of the vehicle (z) for storing electrical energy and/or a fuel;

a crossmember element (32) which is disposed on an upper side (30) of the main floor element (24) facing upwards in the vertical direction of the vehicle (z) and away from the energy store (26) and which extends in the transverse direction of the vehicle (y) between the two side sills (20, 22), wherein a hollow cross section (34) of the crossmember element which is open downwardly in the vertical direction of the vehicle (z) and is delimited upwardly in the vertical direction of the vehicle (z) by an upper flange (36) of the crossmember element (32) is supplemented by the main floor element (24) to form a first closed hollow cross section (38); and a reinforcement element (46), wherein the reinforcement element (46) extends in the transverse direction of the vehicle (y) at least over a partial region of the crossmember element (32);

wherein the reinforcement element (46) reinforces the crossmember element (32) and is disposed on the crossmember element (32) from an outside, wherein the crossmember element (32) and the reinforcement element (46) have a first connection point on the upper flange (36) and a second connection point in a region between the upper flange (36) and the main floor element (24), wherein a first closed hollow cross section (38) is delimited by the crossmember element (32) and the reinforcement element (46);

wherein the reinforcement element (46) has a hollow cross section (50) which is open upwardly in the vertical direction of the vehicle (z) and which is supplemented by the upper flange (36) to form a second closed hollow cross section (52).

9. The floor structure according to claim 1, wherein the energy store (26) is at least partially covered by the two side sills (20, 22) outwardly on both sides in the transverse direction of the vehicle (y).

10. The floor structure according to claim 2, wherein the energy store (26) is at least partially covered by the two side sills (20, 22) outwardly on both sides in the transverse direction of the vehicle (y).

11. A body (10) for a vehicle, comprising:
the floor structure (14) according to claim 1.

* * * * *